(12) United States Patent
Bosveld

(10) Patent No.: US 8,322,746 B1
(45) Date of Patent: Dec. 4, 2012

(54) CART FOR LIFTING AND TRANSPORTING ARTICLES

(76) Inventor: Michael A. Bosveld, Grand Rapids, MI (US)

(*) Notice: Subject to any disclaimer, the term of this patent is extended or adjusted under 35 U.S.C. 154(b) by 300 days.

(21) Appl. No.: 12/727,350

(22) Filed: Mar. 19, 2010

Related U.S. Application Data

(60) Provisional application No. 61/161,601, filed on Mar. 19, 2009.

(51) Int. Cl.
*B62B 1/12* (2006.01)

(52) U.S. Cl. ..... 280/645; 280/641; 280/652; 280/47.18; 280/47.24

(58) Field of Classification Search .................. None
See application file for complete search history.

(56) References Cited

U.S. PATENT DOCUMENTS

| | | | |
|---|---|---|---|
| 1,031,818 A * | 7/1912 | Putman | 182/116 |
| 1,681,944 A | 8/1928 | Marshall, Jr. | |
| 2,679,329 A | 5/1954 | Stout | |
| 3,667,728 A | 6/1972 | Garelick | |
| 3,880,310 A | 4/1975 | Hunziker | |
| 6,000,712 A * | 12/1999 | Wu | 280/639 |
| 6,488,157 B2 | 12/2002 | Chen | |
| 7,036,832 B2 | 5/2006 | Gargaro | |
| 7,188,843 B2 * | 3/2007 | Magness | 280/30 |
| 2005/0254924 A1 | 11/2005 | Swetman et al. | |

* cited by examiner

*Primary Examiner* — Jeffrey J Restifo
*Assistant Examiner* — Erez Gurari
(74) *Attorney, Agent, or Firm* — Gardner, Linn, Burkhart & Flory, LLP

(57) ABSTRACT

A cart includes a first structural member and a second structural member. The first structural member has a first portion, a second portion, and a third portion. The second structural member has a first portion, a second portion, and a third portion. A pivot pivotally connects the first portions of the first and second structural members. A force generator applies a force between the third portions of the first and second structural members. The force generator causes the first and second members to pivot toward each other. A first connector connects the first structural member to a load and a second connector connects the second structural member to the load. In this manner, the pivoting of the first and second structural members toward each other applies a lifting motion at the first and second structural members that is transferred by the first and second connectors to the load. One or more wheels may be provided to support the first and second structural members.

17 Claims, 13 Drawing Sheets

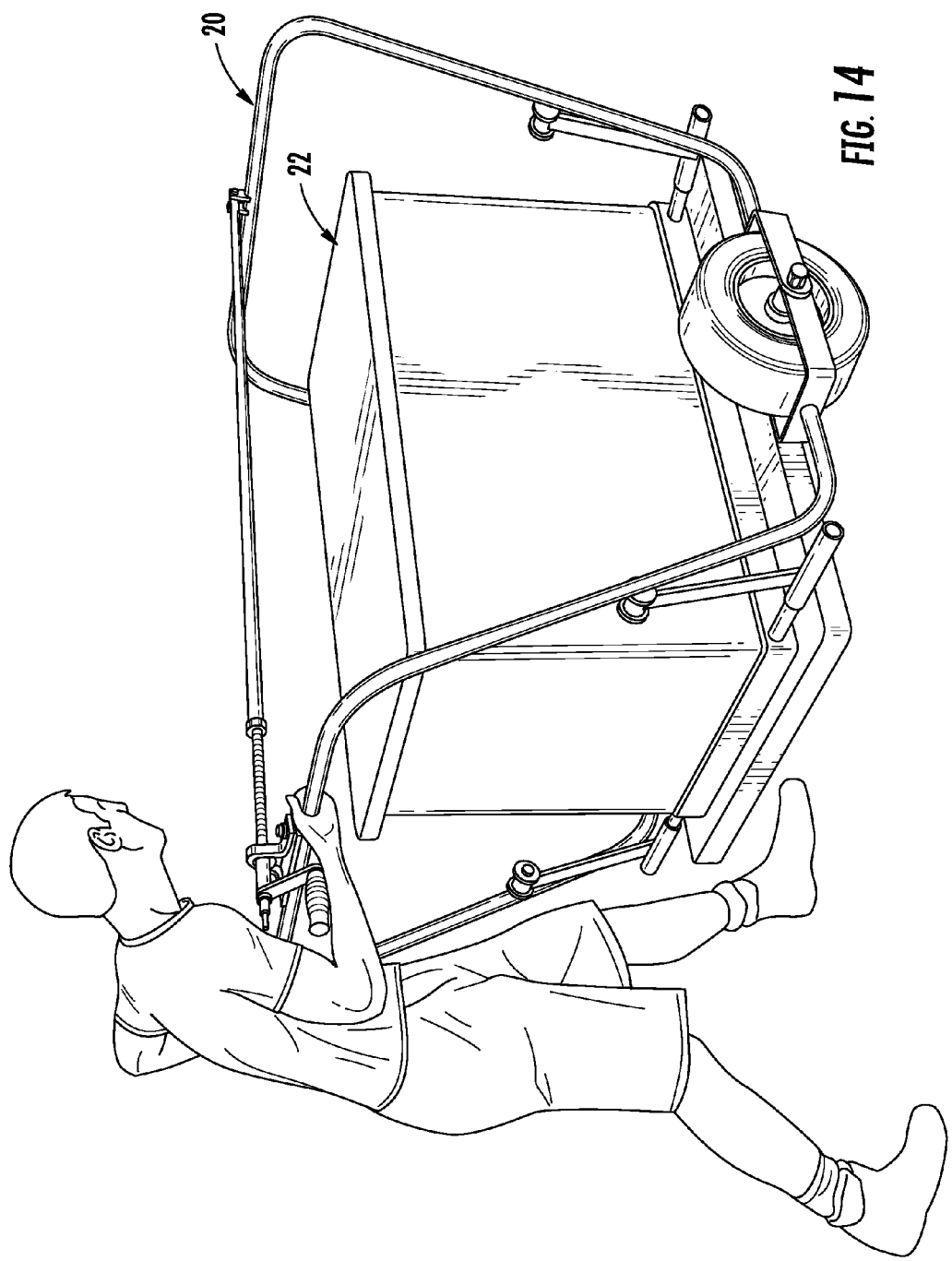

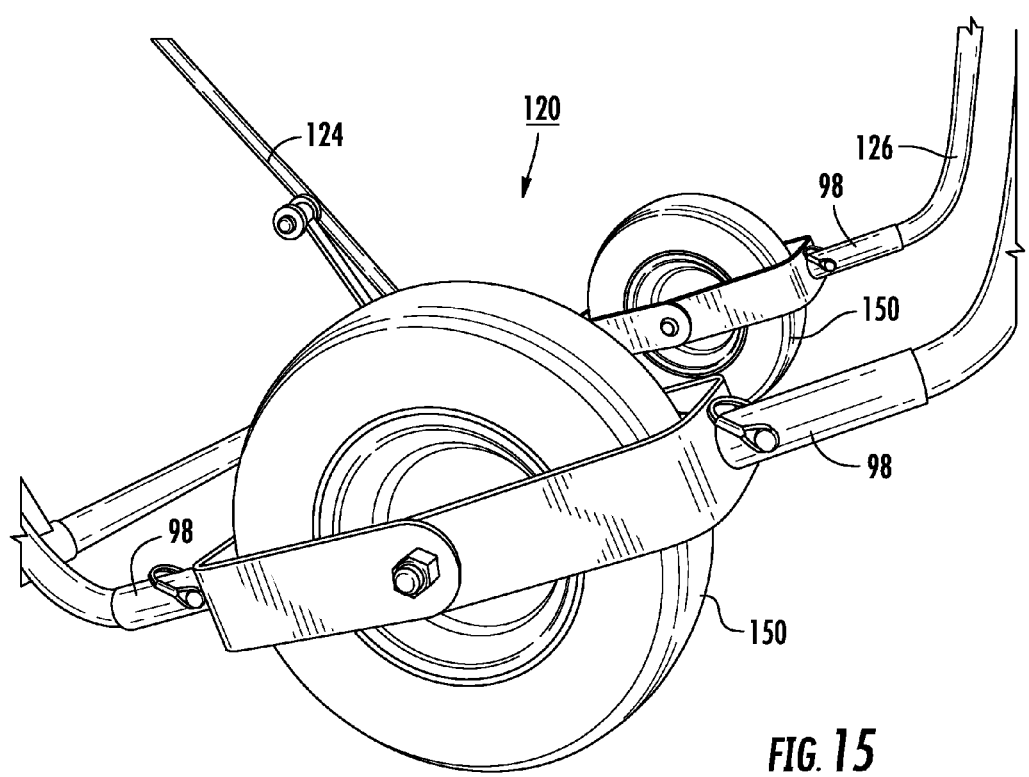

CART FOR LIFTING AND TRANSPORTING ARTICLES

CROSS REFERENCE TO RELATED APPLICATION

This application claims priority from U.S. provisional patent application Ser. No. 61/161,601, filed on Mar. 19, 2009, the disclosure of which is hereby incorporated herein by reference in its entirety.

BACKGROUND OF THE INVENTION

Certain articles are difficult to transport from one location to another. This may be because of their weight, their size, or both their weight and size. Some such articles may be too large for one person to carry. Some may be too heavy for even two persons to carry safely. While general purpose carts are available, they may not operate well over uneven terrain, such as found around construction sites, and the like.

SUMMARY OF THE INVENTION

The present invention is directed to a cart that is capable of both lifting an article off of the ground and transporting that article to another location. While embodiments of the invention are illustrated for use with an emergency electrical generator, they may find use in lifting and transporting of other articles around a construction site, such as heat pump units, compressors, and the like. It may find application in other environments, such as in transporting snowmobiles, watercraft, and the like. Other applications will be apparent to the skilled practitioner.

A cart, according to an aspect of the invention, includes a first structural member and a second structural member. The first structural member has a first portion, a second portion, and a third portion. The second structural member has a first portion, a second portion, and a third portion. A pivot pivotally connects the first portions of the first and second structural members. A force generator applies a force between the third portions of the first and second structural members. The force generator causes the first and second members to pivot toward each other. A first connector connects the first structural member to a load and a second connector connects the second structural member to the load. In this manner, the pivoting of the first and second structural members toward each other applies a lifting motion at the first and second structural members that is transferred by the first and second connectors to the load. One or more wheels may be provided to support the first and second structural members.

A cart, according to another aspect of the invention, includes a generally U-shaped first bar and a generally U-shaped second bar. The first bar has a first lateral side portion, a second lateral side portion, and a transverse portion between the first and second lateral side portions of the first bar. The second bar has a first lateral side portion, a second lateral side portion and a transverse portion between the first and second lateral side portions of the second bar. The first lateral side portions of the first and second bars are pivotally connected opposite the transverse portions to pivot about an axis. A first wheel is provided that is rotatable about the axis. The second lateral side portions of the first and second bars are pivotally connected opposite the transverse portions to pivot about the axis. A second wheel is provided that is rotatable about the axis. At least two first connectors are provided. Each is mounted at one end respectively to the first and second lateral side portions of the first bar between said transverse portion of the first bar and the axis. At least two second connectors are provided. Each is mounted at one end respectively to the first and second lateral side portions of the second bar between the transverse portion of the second bar and the axis. A tensioner extends between the first and second bars to selectively pull the first and second bars toward each other to elevate a load suspended by another end of the first and second connectors.

These and other objects, advantages, and features of this invention will become apparent upon review of the following specification in conjunction with the drawings.

BRIEF DESCRIPTION OF THE DRAWINGS

FIG. 14 is a perspective view showing the cart being used to transport the load; and FIG. 15 is an enlarged perspective view of an alternative embodiment.

DESCRIPTION OF THE PREFERRED EMBODIMENT

Figure 1:
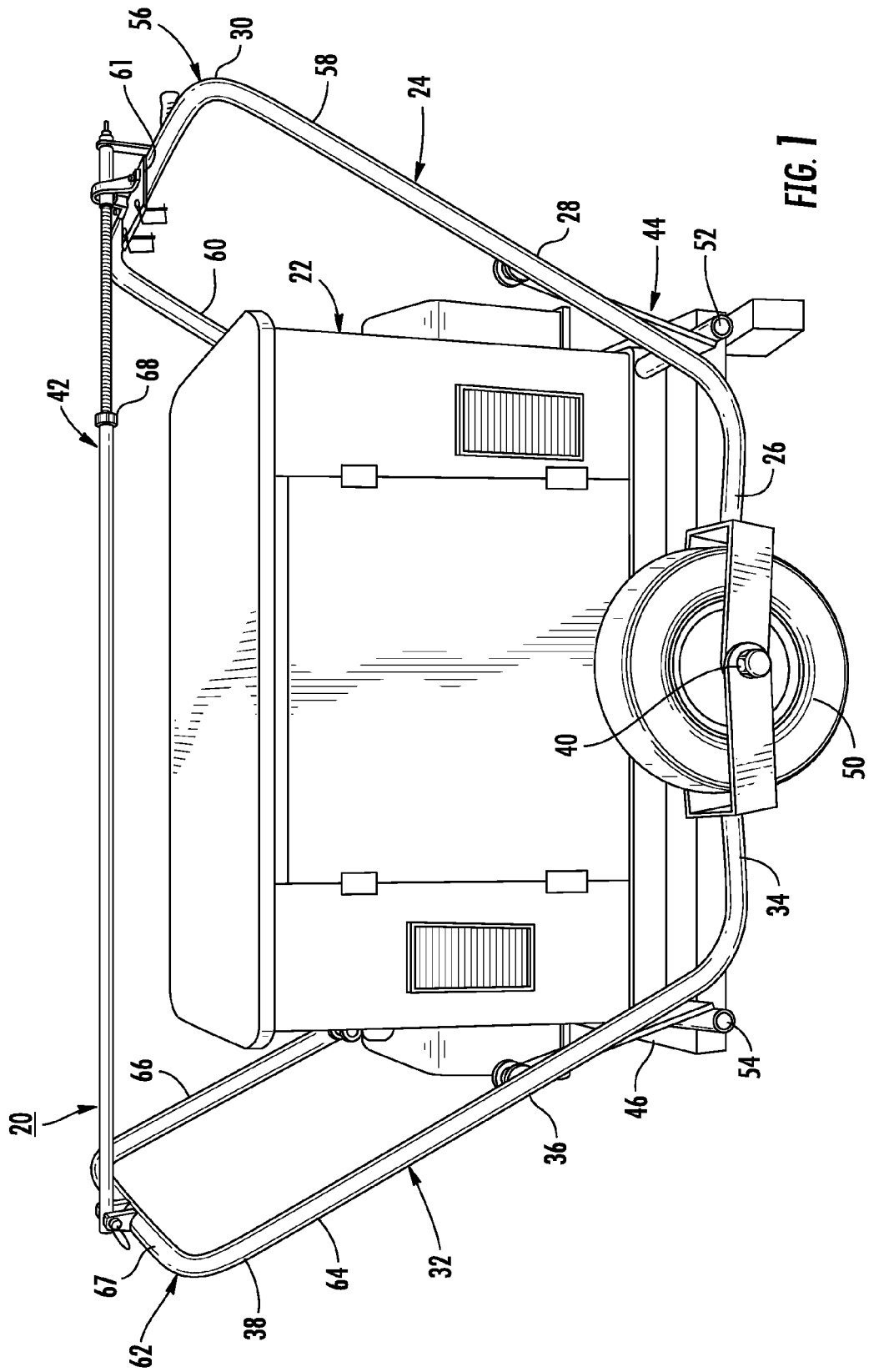
FIG. 1 is a side elevation of a cart, according to an embodiment of the invention, supporting a load.

Referring now to the drawings and the illustrative embodiments depicted therein, a cart 20 is shown supporting a load 22 off of the ground (FIG. 1). In the illustrative embodiment, cart 20 is shown for use with an emergency generator unit having two through openings 23 at opposite ends of its base. Cart 20 engages load 20 at such openings. However, the cart could be readily modified to engage the load in another fashion that is appropriate for the configuration of the load as would be apparent to the skilled practitioner.

Cart 20 includes a first structural member 24 and a second structural member 32. First structural member 24 has a first portion 26, a second portion 28, and a third portion 30. Second portion 28 is between the first and third portions. Second structural member 32 has a first portion 34, a second portion 36, and a third portion 38. Second portion 36 is between the first and third portions. First structural member 24 and second structural member 32 are pivotally connected at a pivot 40. A force generator 42 is provided that applies a force between third portion 30 of first structural member 24 and third portion 38 of second structural member 32. Force generator 42 causes first structural member 24 and second structural member 32 to pivot with respect to each other.

Cart 20 includes a first connector shown at 44 that connects second portion 28 of first structural member 24 to load 22 and a second connector shown at 46 that connects second portion 36 of second structural member 32 to the load. At least two wheels 50 are provided for supporting the first and second structural members. Wheels 50 are rotatable about a common axis. In the illustrated embodiment, wheels 50 are rotatable about the same axis as pivot 40. However, wheels 50 could, alternatively, rotate about an axis different from the pivot axis of pivot 40. Also, only one wheel or more than two wheels may be used.

Figure 7:
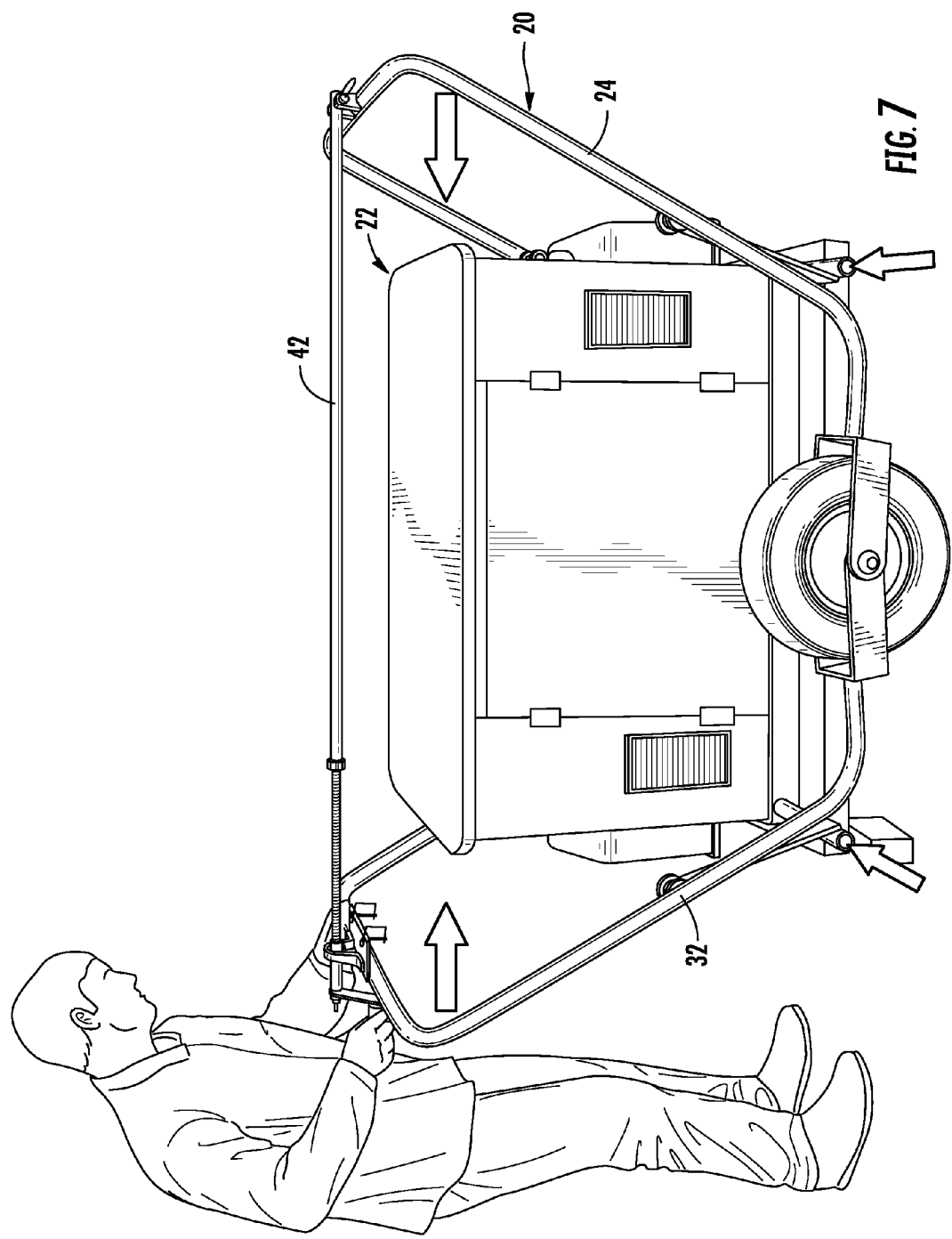
FIG. 7 is a side elevation showing actuation of a force generator to elevate the load off of the ground.

Cart 20 elevates a load 22 as follows. As illustrated in FIG. 7, actuation of force generator 42 causes first structural member 24 and second structural member 32 to pivot toward each other. With load 22 connected with first and second connectors 44, 46, the pivoting of first structural member 24 and second structural member 32 toward each other, as they pivot about pivot 40, causes a lifting motion to be applied by the second portions of the first and second structural members that is transferred by the first and second connectors to the load. Once load 22 is elevated off of the ground, it may be transported by balancing the load about wheels 50 and propelling the load while travelling on the wheels.

Figure 11:
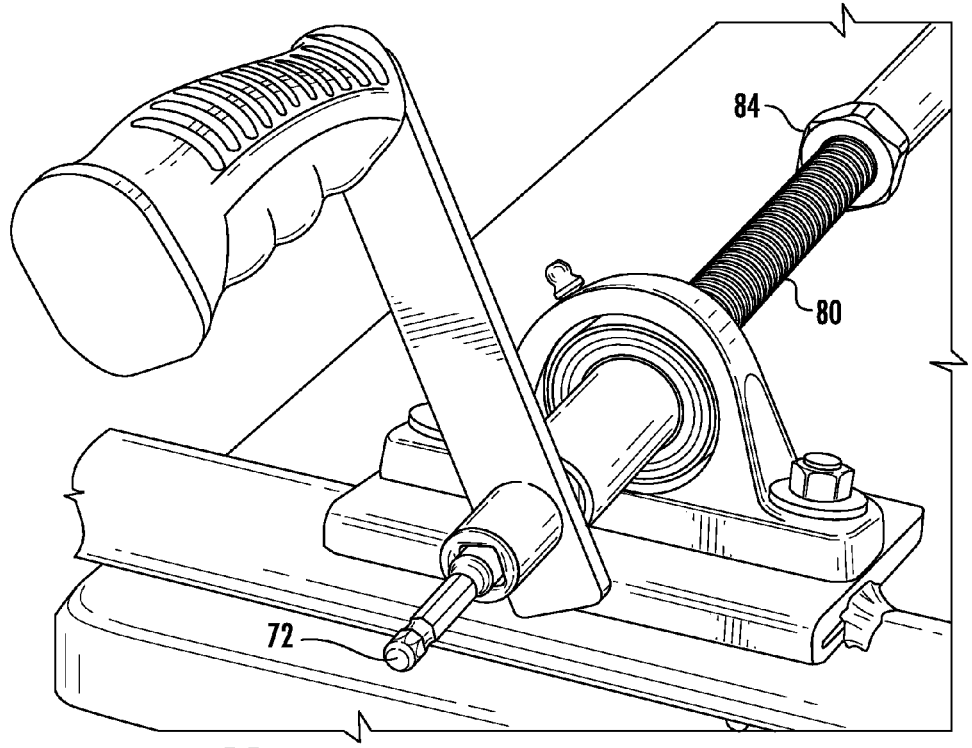
FIG. 11 is the same view as FIG. 10 of an alternative embodiment of an actuator for the force generator.

In the illustrated embodiment, force generator 42 is a tensioner that pulls the third portions of said first and said second structural members toward each other. Such tensioner may be in the form of a jackscrew 68 made up of a threaded rod 80 connected with a rotary actuator 82 and a nut 84 connected with a hollow tube 86. In this manner, the rotation of threaded rod 80 by rotary actuator 82 causes nut 84 and, hence, hollow tube 86 that are connected with second structural member 32 to be moved closer to or further from rotary actuator 82, which is connected with first structural member 24. In the illustrated embodiment, threaded rod 80 and nut 84 are supplied by Acme in the form of a square cut thread. However, other thread configurations may be used. In the illustrated embodiment, rotary actuator 82 is a hand crank. However, various forms of motors may be used. For example, a socket 88 may be provided to receive a drill bit 72, shown in FIG. 11. This allows a conventional drill motor (not shown) to be used as a rotary actuator to rotate threaded rod 80. Other forms of a tensioner, such as a hydraulic cylinder or a pneumatic cylinder, may be used. Also, as would be apparent to the skilled practitioner, various forms of linkage could be used to translate an expansion force to a force pulling the first and second structural members toward each other.

In the illustrated embodiment, first structural member 24 is in the form of a generally U-shaped first bar 56 having a first lateral side portion 58, a second lateral side portion 60, and a transverse portion 61 between the first and second lateral side portions of the first bar. Likewise, second structural member 32 is in the form of a generally U-shaped second bar 62 having a first lateral side portion 64, a second lateral side portion 66, and a transverse portion 67 between the first and second lateral side portions of the second bar. In the illustrated embodiment, first and second bars 56, 62 are each formed from a common tubular member. However, they could be formed from non-tubular members as well as from members that are fastened together using known techniques. It can be seen that the first lateral side portions 58, 64 of the first and second bars are pivotally connected opposite their transverse portions 61, 67 to pivot about an axis that includes one of wheels 50 rotatable about that axis. It can also be seen that the second lateral side portions 60, 66 of the first and second bars pivotally connected opposite their transverse portions 61, 67 to pivot about an axis includes another wheel 50 rotatable about that axis.

First connector 44 is made up of at least two first connectors 44a, 44b, each mounted at one end, respectively, to said first and second lateral side portions 58, 60 of said first bar between its transverse portion 61 and the corresponding wheel 50. Second connector 46 is made up of at least two second connectors 46a, 46b, each mounted at one end, respectively, to first and second lateral side portions 64, 66 of the second bar between its transverse portion 67 and its corresponding wheel. In the illustrated embodiment, load 22 has a pair of openings 23 extending through its base at opposite ends thereof. A first rod 52 spans first connectors 44a, 44b and passes through one opening 23 to support one end of the load. A second rod 54 spans second connectors 46a, 46b and passes through the other opening to support an opposite end of the load. Connectors 44a, 44b, 46a, and 46b may be made up of generally rigid straps or flexible straps and be fastened at one end to the respective first or second bar. The opposite end of the straps is configured to interface with one of the rods 52, 54. Tensioner 42 extends between first and second bars 56, 62, such as between transverse portions 61, 67 to selectively pull the first and second bars toward each other to elevate a load suspended by another end of said first and second connectors.

Figure 2:
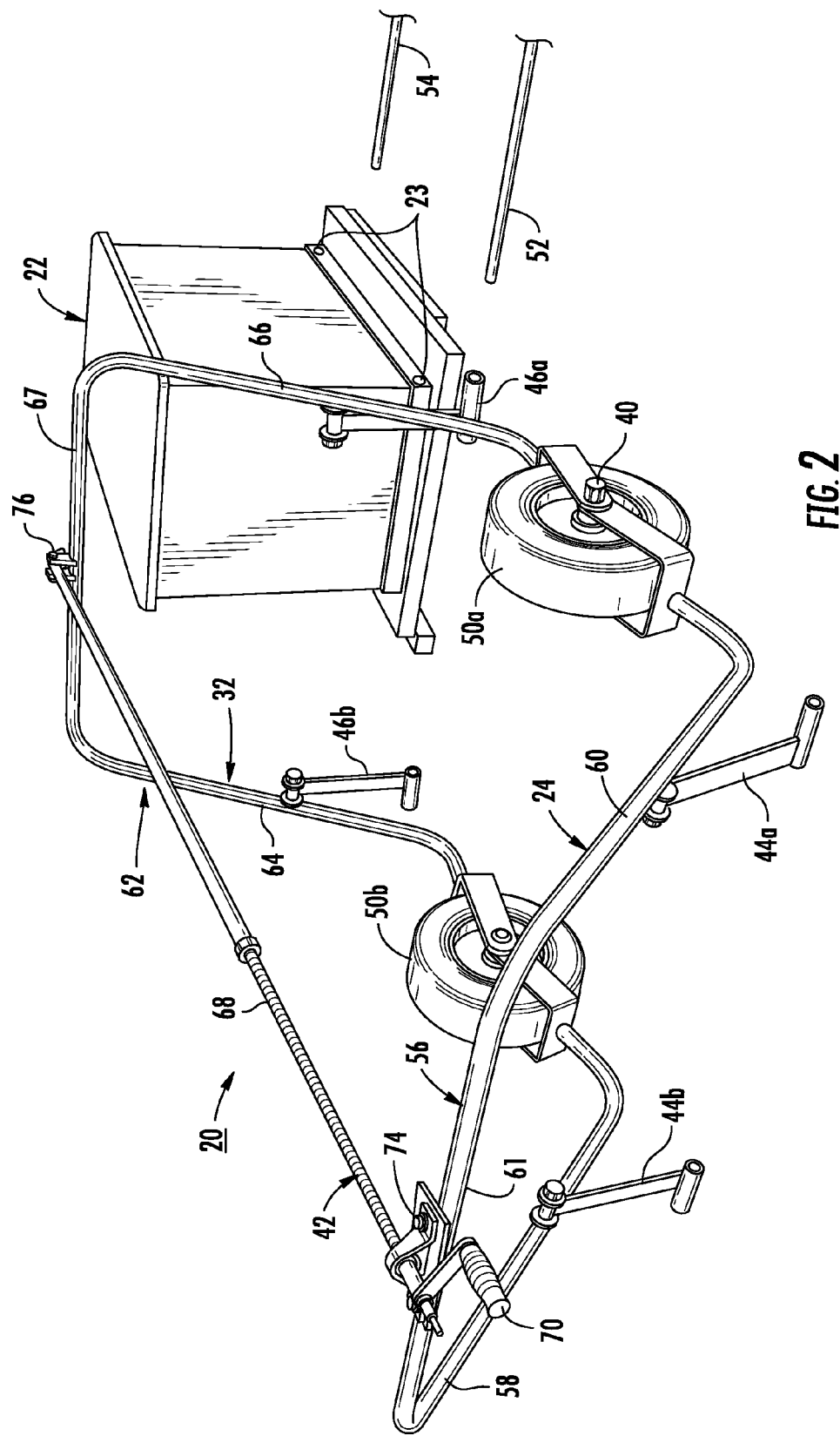
FIG. 2 is a perspective view of the cart of FIG. 1 being prepared for engagement with the load.
Figure 3:
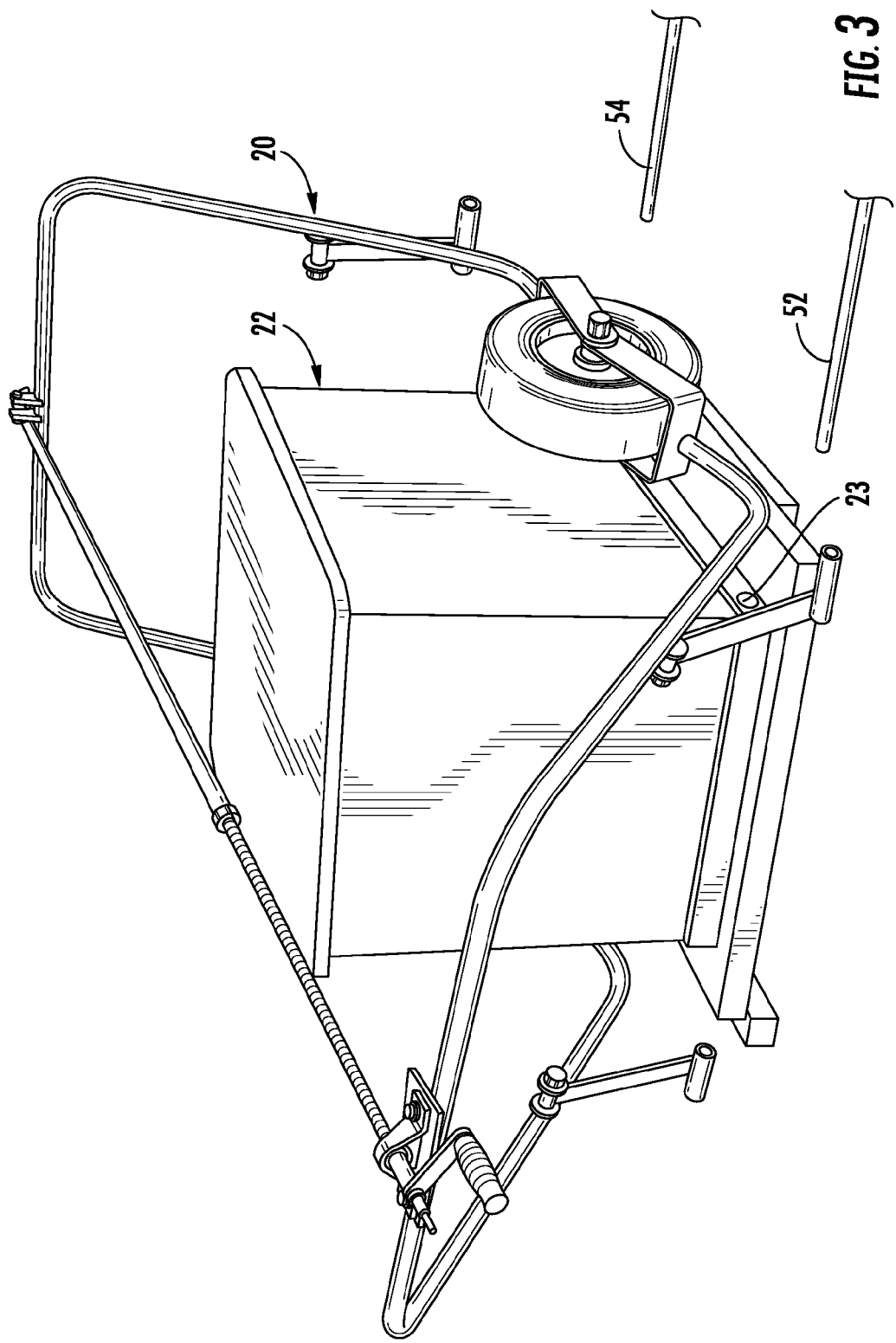
FIG. 3 is the same view as FIG. 2 showing the cart being juxtaposed with the load.
Figure 4:
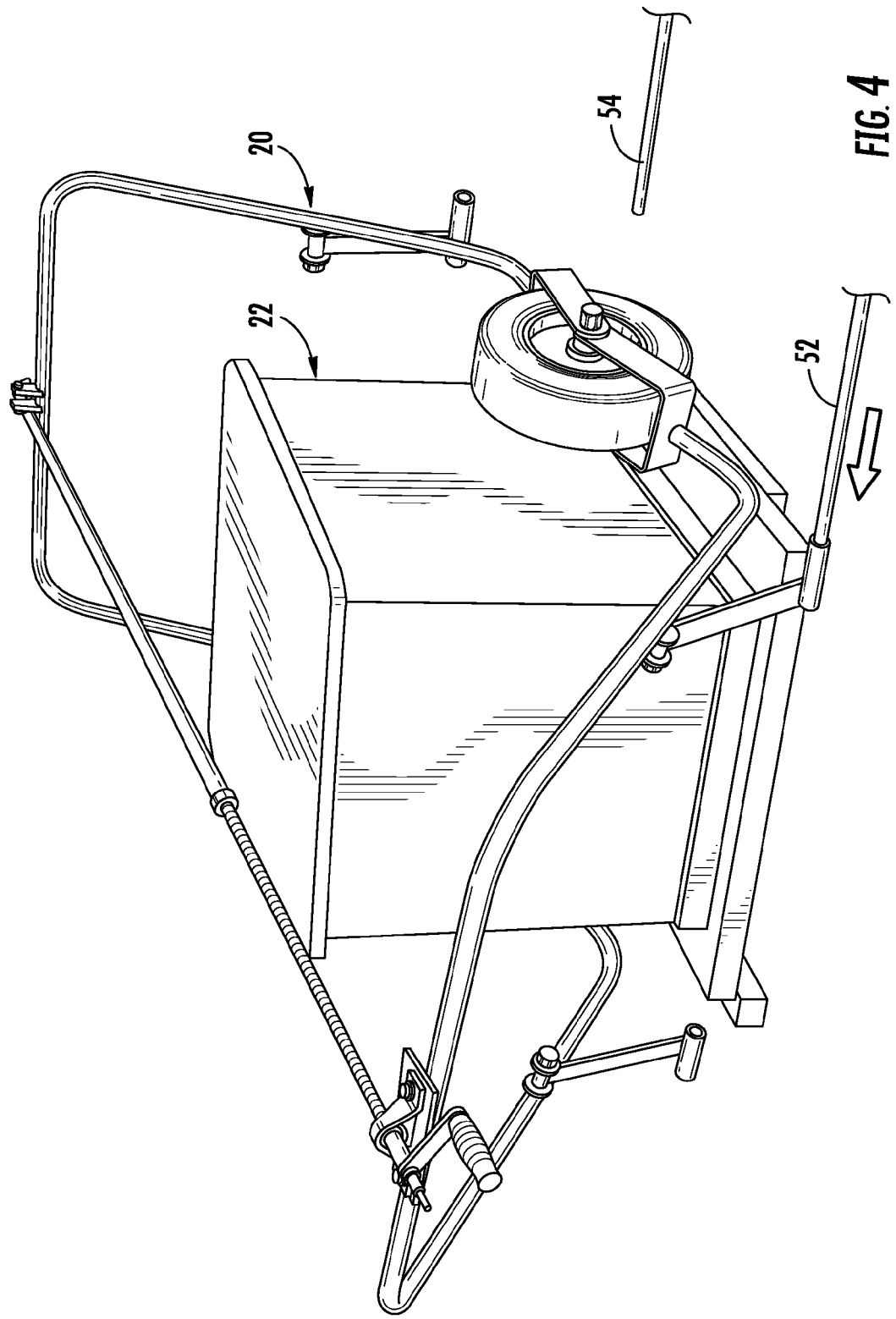
FIG. 4 is the same view as FIG. 2 showing a rod being inserted between one lateral side of a connector and one end of the load.
Figure 5:
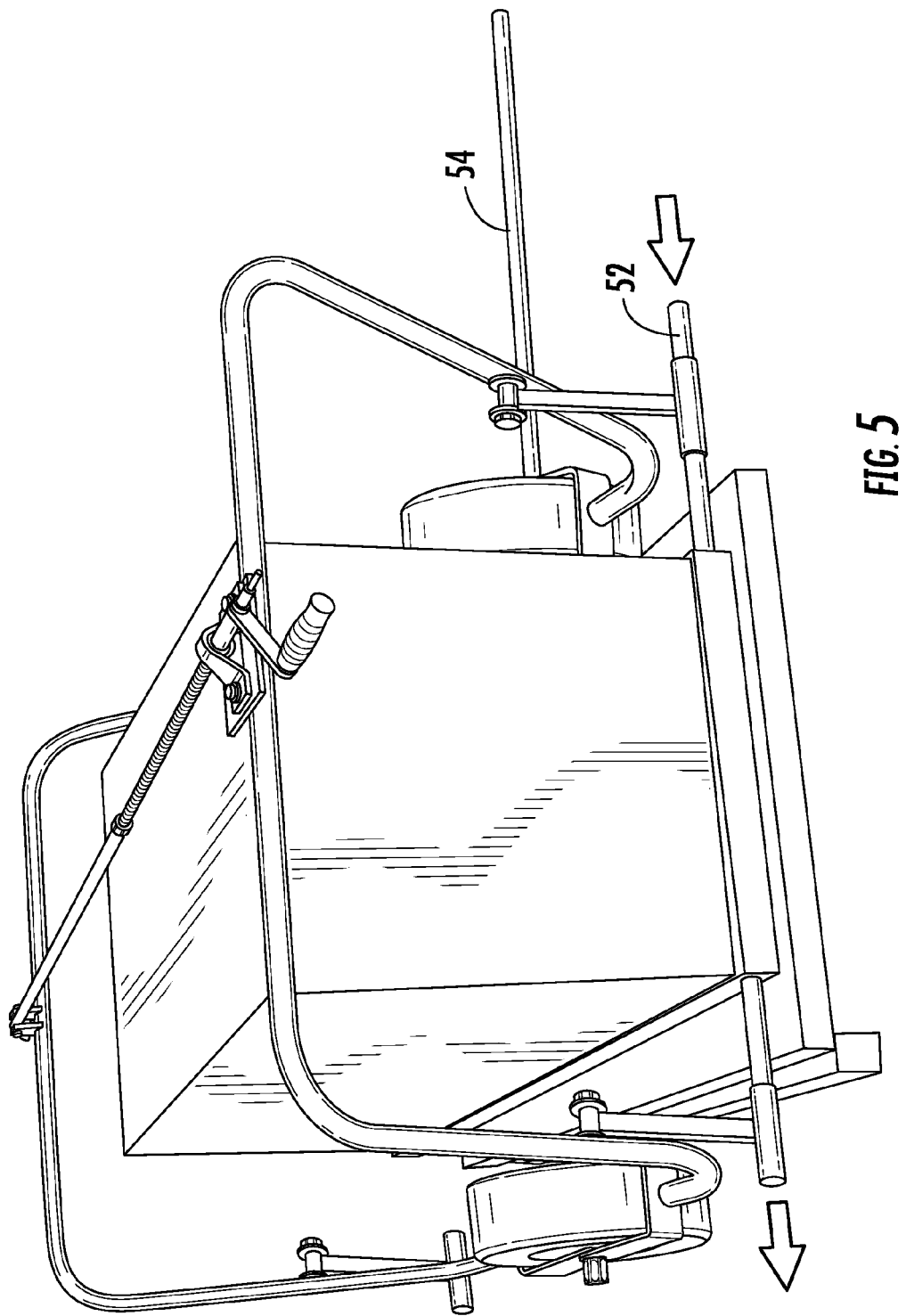
FIG. 5 is the same view as FIG. 4 showing the rod being inserted in another lateral side of the connector.
Figure 6:
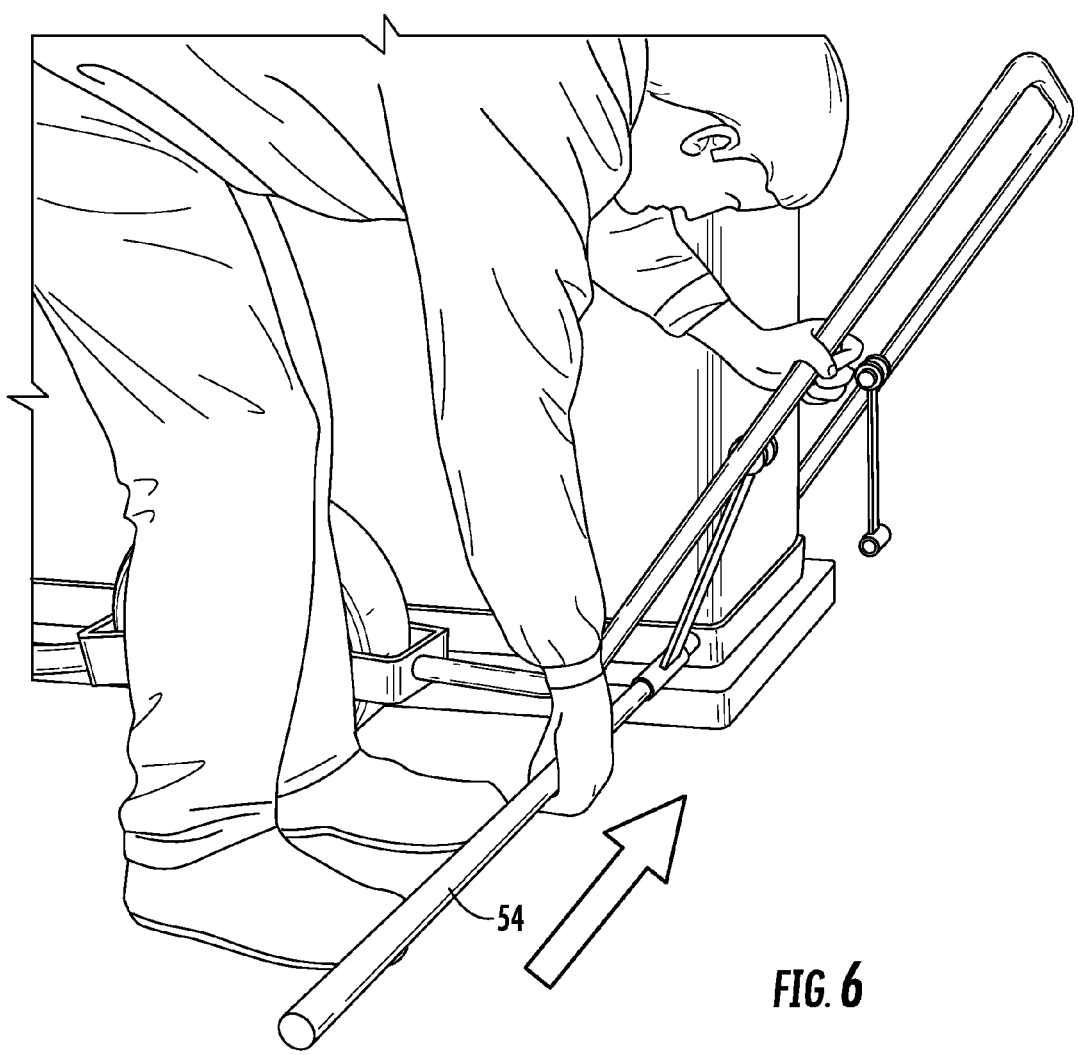
FIG. 6 is a side elevation showing another rod being inserted between one lateral side of another connector and the other end of the load.

Cart 20 may be applied to load 22 as follows. The cart is moved into position straddling the load (FIGS. 2 and 3). Rods 52, 54 are slid through openings in connectors 44a, 44b, 46a, 46b and through openings 23 in the base of the load (FIGS. 4-6). Crank 70 is rotated to pull transverse portions 61, 67 of the bars toward each other, which places an upward force on rods 52, 54 tending to lift the load off of the ground (FIG. 7). With the load off of the ground, the operator can balance the load on wheels 50 and propel the cart by pushing or pulling on either transverse portion 61 or 67, which functions as a user handle (FIG. 14).

Figure 8:
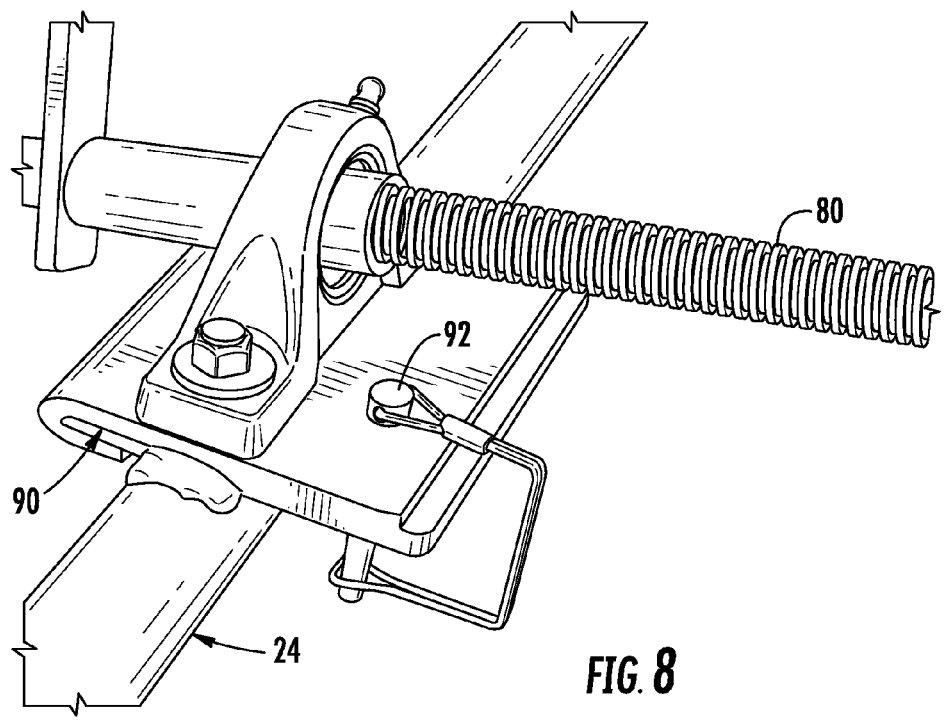
FIG. 8 is an enlarged perspective view of a detachable mount of one end of the force generator.
Figure 9:
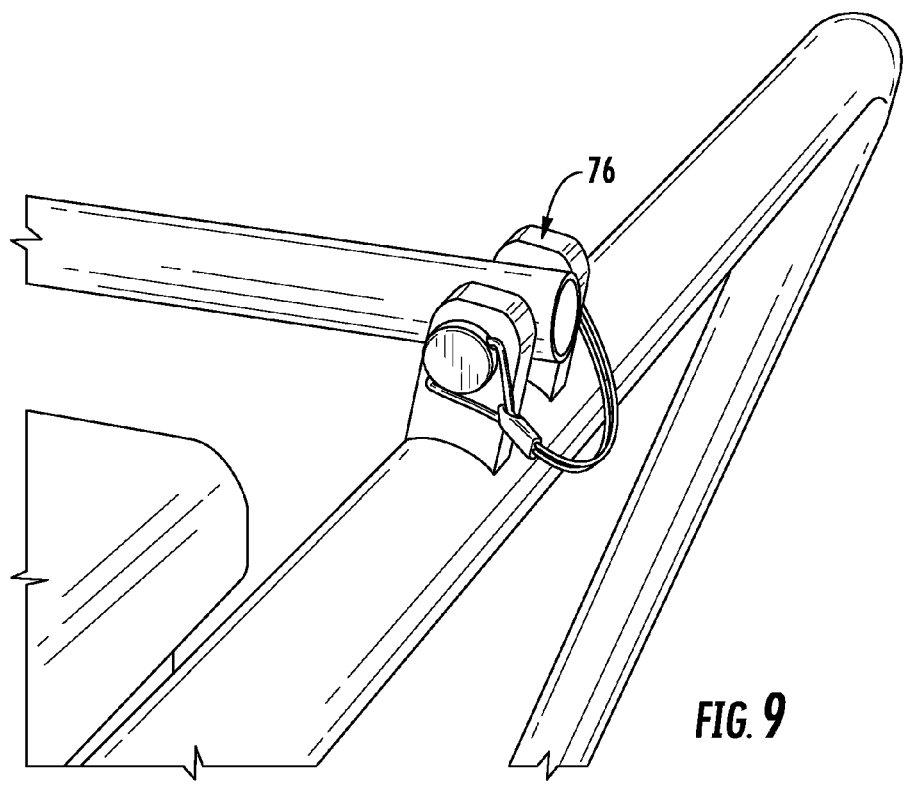
FIG. 9 is an enlarged perspective view of another detachable mount of the other end of the force generator.
Figure 10:
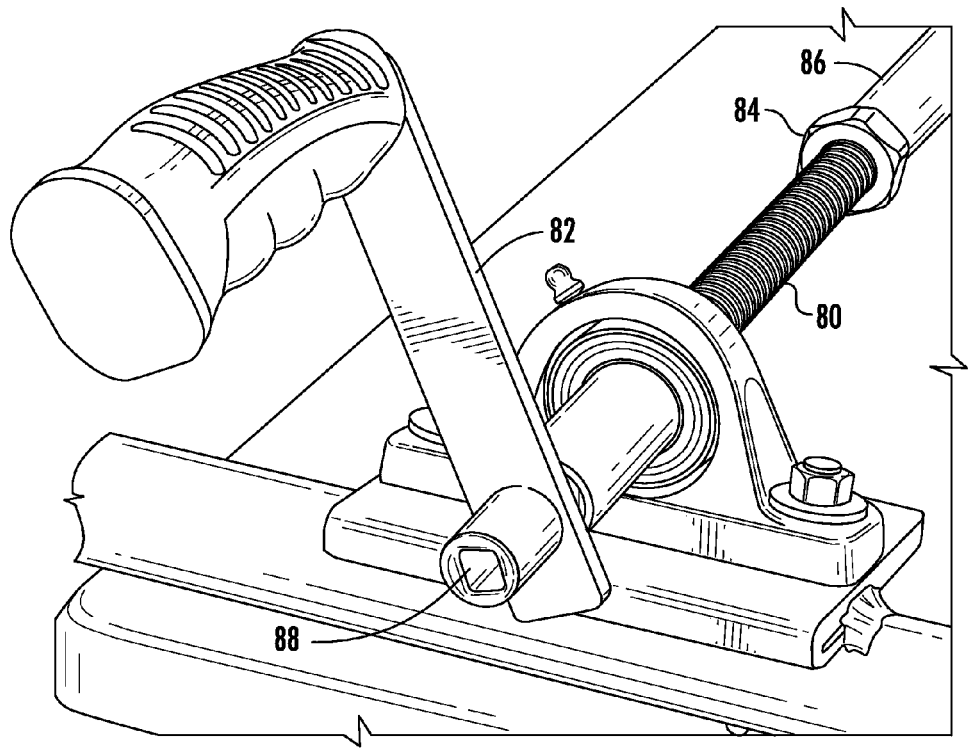
FIG. 10 is an enlarged perspective view of an actuator for the force generator.
Figure 12:
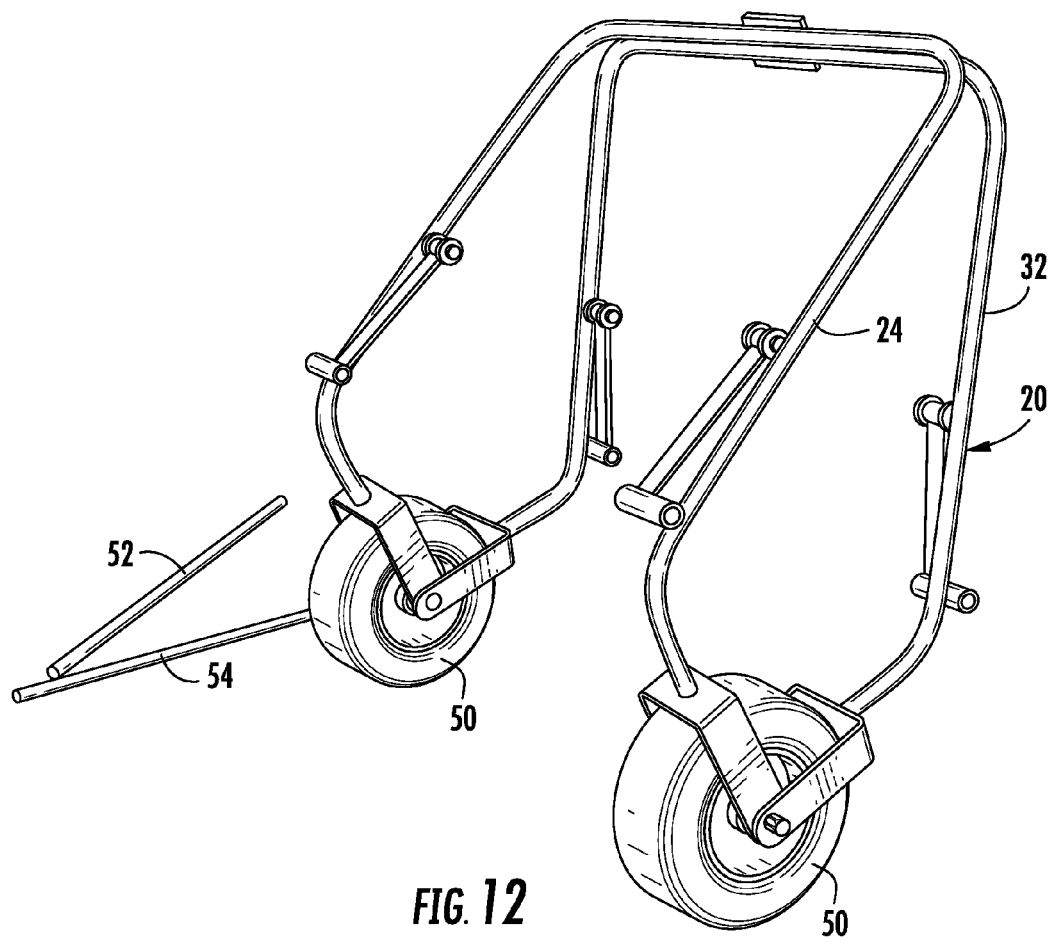
FIG. 12 is a perspective view showing the cart in a stowage position.
Figure 13:
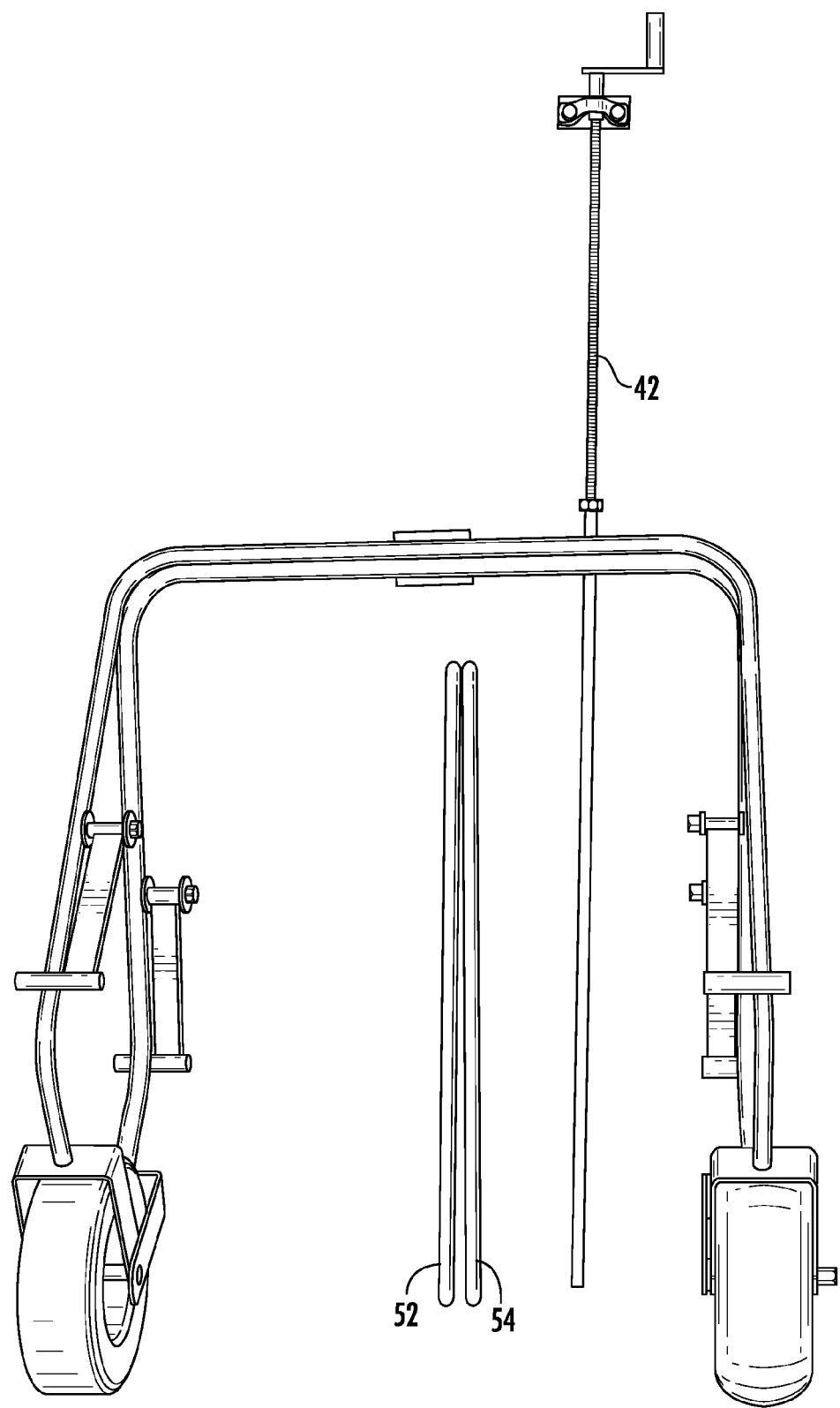
FIG. 13 is an end elevational view showing the cart in the stowage position.

Tensioner 42 may be detachably mounted to first structural member 24, second structural member 32, or both, to allow the first and second structural members to move to a non-use configuration, shown in FIGS. 12 and 13. This may be accomplished using a first detachable mount 74 to attach the crank end of the tensioner to first structural member 24 (FIG. 8). It can be seen that mount 74 includes a tongue and groove interface to absorb the load placed on the mount by operation of the tensioner and a pin 92 to maintain the interface together in use. Thus, removal of the pin will allow the interface to be disconnected. The other end of tensioner 42 may be attached to second structural member 32 by a detachable mount 76 in the form of a removable hinge pin. Also, a mechanical brake (not shown) may be provided for one or both wheels 50 to allow the structural members to stand up against a wall, as shown in FIG. 12, in a storage configuration.

Other variations will be apparent to the skilled practitioner. For example, a cart 120 is provided having first and second structural members 124, 126 that may be separable at wheels 150 (FIG. 15), such as by utilizing quick connect 98 in order to allow the cart to be further reduced in volume for shipping, storage, or the like. Also, in order to transport the load, a trailer hitch may be mounted to the cart to allow it to be towed, such as by a tractor.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. A cart, comprising:
a first structural member having a first portion, a second portion and a third portion;
a second structural member having a first portion, a second portion, and a third portion;
a pivot that pivotally connects said first portions of said first and second structural members;
a force generator that applies a force between said third portions of said first and second structural members, wherein said force generator causes said first and second members to pivot with respect to each other, wherein said force generator comprises a tensioner, wherein said tensioner pulls said third portions of said first and said second structural members toward each other, wherein said tensioner comprises a jackscrew, wherein said jackscrew is rotated by at least one chosen from a crank and a motor, wherein said tensioner is detachably mounted to at least one chosen from said first structural member and said second structural member to allow said first and second structural members to move to a non-use configuration;
a first connector connecting said first structural member to a load and a second connector connecting said second structural member to the load wherein the force member causing the pivoting of said first and second structural members toward each other applies a lifting motion at said first and second structural members that is transferred by said first and second connectors to the load; and
at least two wheels supporting said first and second structural members said wheels being rotatable about a common axis.

2. The cart as claimed in claim 1 wherein said first and second structural members are separable at said pivot in said non-use configuration.

3. The cart as claimed in claim 1 wherein said first and second connectors comprise straps.

4. The cart as claimed in claim 1 wherein each of said first and second structural members has a first lateral side and a second lateral side, wherein a load is supported between said first and second lateral sides of said first and second structural members.

5. A cart, comprising:
a first structural member having a first portion, a second portion and a third portion;
a second structural member having a first portion, a second portion, and a third portion;
a pivot that pivotally connects said first portions of said first and second structural members;
a force generator that applies a force between said third portions of said first and second structural members, wherein said force generator causes said first and second members to pivot with respect to each other;
a first connector connecting said first structural member to a load and a second connector connecting said second structural member to the load, wherein the force member causing the pivoting of said first and second structural members toward each other applies a lifting motion at said first and second structural members that is transferred by said first and second connectors to the load;
at least two wheels supporting said first and second structural members, said wheels being rotatable about a common axis, wherein each of said first and second structural members has a first lateral side and a second lateral side, wherein a load is supported between said first and second lateral sides of said first and second structural members; and
a first cross member connecting said first and second lateral sides of said third portion of said first structural member and a second cross member connecting said first and second lateral sides of said third portion of said second structural member, wherein said force generator is connected with said first and second cross members.

6. The cart as claimed in claim 5 wherein said common axis coincides with said pivot.

7. The cart as claimed in claim 5 wherein said force generator comprises a tensioner, wherein said tensioner pulls said third portions of said first and said second structural members toward each other.

8. The cart as claimed in claim 7 wherein said tensioner comprises a jackscrew.

9. The cart as claimed in claim 8 wherein said jackscrew is rotated by at least one chosen from a crank and a motor.

10. A cart comprising:
a generally U-shaped first bar comprising a first lateral side portion, a second lateral side portion, and a transverse portion between said first and second lateral side portions of said first bar;
a generally U-shaped second bar comprising a first lateral side portion, a second lateral side portion, and a transverse portion between said first and second lateral side portions of said second bar;
said first lateral side portions of said first and second bars pivotally connected opposite said transverse portions to pivot about an axis and including a first wheel rotatable about said axis;
said second lateral side portions of said first and second bars pivotally connected opposite said transverse portions to pivot about said axis and including a second wheel rotatable about said axis;
at least two first connectors, each mounted at one end respectively to said first and second lateral side portions of said first bar between said transverse portion of said first bar and said axis;
at least two second connectors, each mounted at one end respectively to said first and second lateral side portions of said second bar between said transverse portion of said second bar and said axis; and
a tensioner extending between said first and second bars to selectively pull said first and second bars toward each other to elevate a load suspended by another end of said first and second connectors.

11. The cart as claimed in claim 10 wherein said tensioner comprises a jackscrew.

12. The cart as claimed in claim 11 wherein said jackscrew is rotated by at least one chosen from a crank and a motor.

13. The cart as claimed in claim 10 wherein said tensioner is detachably mounted to said transverse portions of said first and second bars to allow said first and second bars to move to a non-use position.

14. The cart as claimed in claim 13 wherein said first and second bars are separable at said first and second axis.

15. The cart as claimed in claim 10 wherein said first and second connectors comprise straps.

16. The cart as claimed in claim 10 including a first rod spanning said at least two first connectors to support one end of the load and a second rod spanning said at least two second connectors to support an opposite end of the load.

17. The cart as claimed in claim 10 wherein said tensioner extends between said transverse portions of said first and second bars.

\* \* \* \* \*